Patented May 27, 1924.

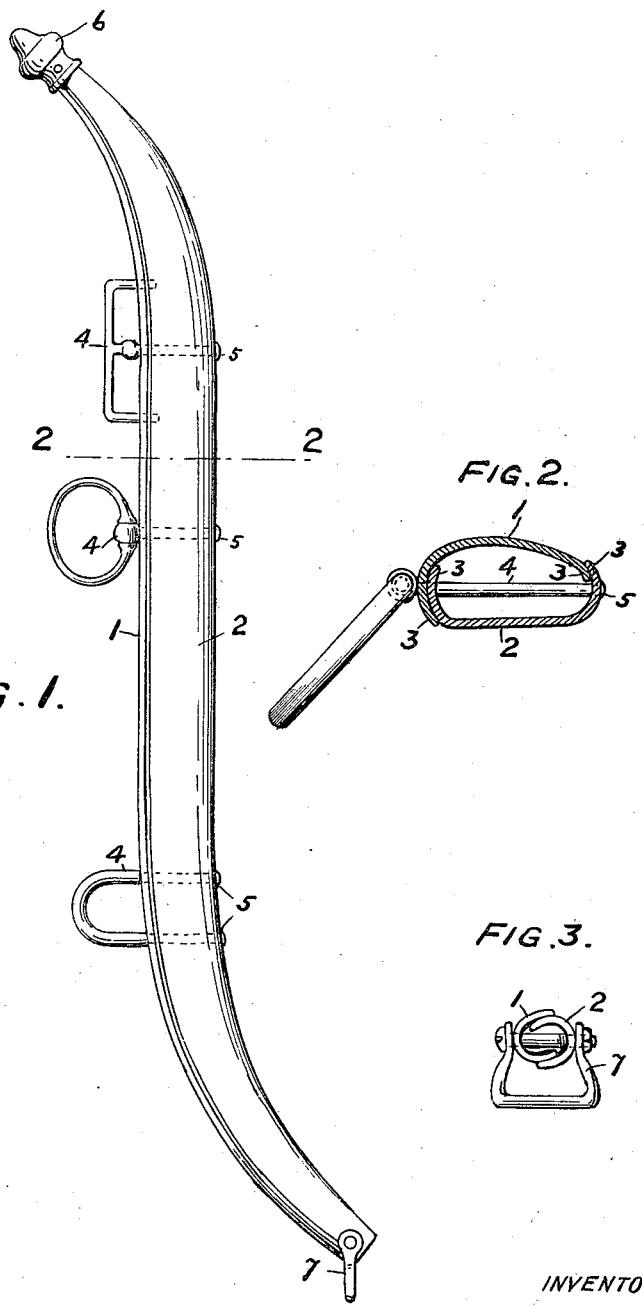

1,495,507

UNITED STATES PATENT OFFICE.

CHARLES E. CAMERON, OF MERCHANTVILLE, NEW JERSEY.

HAME.

Application filed May 29, 1923. Serial No. 642,171.

*To all whom it may concern:*

Be it known that I, CHARLES E. CAMERON, a citizen of the United States, residing at Merchantville, in the county of Camden and State of New Jersey, have invented a new and useful Improvement in Hames, of which the following is a specification.

The principal object of the present invention is, first, to simplify the manufacture of tubular metal hames and to thereby reduce their cost; and second, to provide tubular metal hames of which the shape in cross-section can be made with accuracy and without difficulty. Other objects of the invention will appear from the following description and the invention itself will be claimed at the end of the description.

In the description reference will be made to the accompanying drawings forming part hereof and in which—

Figure 1 is an elevation of a hame embodying features of the invention.

Fig. 2 is a sectional view taken on the line 2—2 of Figure 1 and drawn to an enlarged scale, and Fig. 3 is a side view of the lower end of the hame.

In the drawings 1 and 2 are a pair of metallic channel members each conforming to the form of a hame and each having a marginal flange 3. The member 2 is comparatively flat to provide a proper bearing surface for contact with a horse collar, and the member 1 is comparatively curved in cross-section to provide the proper form for the surface of the hame which is remote from the collar. The respective flanges of the members are in underlapping and overlapping relation. The mountings 4 pass through openings provided in the flanges and extend across the space between the members and are riveted as at 5. The mountings which pass through the flanges and are riveted on the outside of one of the members constitute means for holding the members in assembled position. The cap 6 and the shackle 7 arranged at the ends of the hame serve also to hold the members in assembled relation.

The members can be struck up or pressed from flat plates of suitable contour provided with the necessary openings for the passage of the mountings so that the operations involved are very few in number. The members are readily assembled by superposing and passing the mountings through the openings and then riveting the mountings.

It will be obvious that modifications may be made without departing from the spirit of the invention which is not limited in regard to the details shown or otherwise than as the prior art and the appended claims may require.

I claim:

1. A tubular hame comprising in combination a pair of metallic channel members each conforming to the form of a hame and each having a marginal flange, the respective flanges of the members being in underlapping and overlapping relation and at the outer and inner portions of the hame, and mountings passing through openings provided in all said flanges and extending across the space between said members and constituting means for holding said members in assembled relation.

2. A tubular hame comprising in combination a pair of metallic channel members each conforming to the form of a hame and each having a marginal flange and whereof one is comparatively flat to provide a collar bearing and whereof the other is comparatively curved, the respective flanges of the members being in underlapping and overlapping relation at the outer and inner portions of the hame, and mountings passing through openings provided in all said flanges and extending across the space between said members and constituting means for holding said members in assembled relation.

CHARLES E. CAMERON.